US010679439B2

(12) United States Patent
Han

(10) Patent No.: US 10,679,439 B2
(45) Date of Patent: Jun. 9, 2020

(54) METHOD AND DEVICE FOR CONTROLLING CODE LOCK

(71) Applicant: Baidu Online Network Technology (Beijing) Co., Ltd., Beijing (CN)

(72) Inventor: Junfang Han, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/355,583

(22) Filed: Mar. 15, 2019

(65) Prior Publication Data

US 2019/0213814 A1 Jul. 11, 2019

Related U.S. Application Data

(63) Continuation of application No. PCT/CN2017/079717, filed on Apr. 7, 2017.

(30) Foreign Application Priority Data

Dec. 2, 2016 (CN) .......................... 2016 1 1110548

(51) Int. Cl.
*G07C 9/00* (2020.01)
*G07F 17/00* (2006.01)
(Continued)

(52) U.S. Cl.
CPC ..... *G07C 9/00182* (2013.01); *G07C 9/00174* (2013.01); *G07C 9/00571* (2013.01);
(Continued)

(58) Field of Classification Search
CPC ............ G07C 9/00182; G07C 9/00174; G07C 9/00571; G07C 9/00896; G07C 2209/08; G07F 17/0057
(Continued)

(56) References Cited

U.S. PATENT DOCUMENTS 8,437,740 B2 * 5/2013 Despain .................. G07C 9/27 455/410
8,482,378 B2 * 7/2013 Sadighi ............. G07C 9/00571 340/5.2
(Continued)

FOREIGN PATENT DOCUMENTS

CN 102207948 A 10/2011
CN 104424678 A 3/2015
(Continued)

OTHER PUBLICATIONS

International Patent Application No. PCT/CN2017/079717; International Search Report and Written Opinion dated Aug. 14, 2017; 7 pgs. (relevance found in English ISR and citations).

*Primary Examiner* — Nam V Nguyen
(74) *Attorney, Agent, or Firm* — Lathrop GPM LLP

(57) ABSTRACT

Disclosed are a method and a device for controlling a code lock. The method comprises: receiving an unlock request for a target code lock sent by a client; parsing the unlock request to determine whether the unlock request satisfies a preset unlock condition; in response to determining that the unlock request satisfies the preset unlock condition, acquiring the current state of the target code lock; if the current state of the target code lock is a locked state, acquiring the unlock code of the current code pair for the target code lock, changing the current state of the target code lock to an unlocked state, and sending the acquired unlock code to the client; and in response to receiving the lock feedback code of the current code pair for the target code lock sent by the client, changing the current state of the target code lock to a locked state.

19 Claims, 6 Drawing Sheets

(51) Int. Cl.
*H04L 9/00* (2006.01)
*H04B 1/00* (2006.01)

(52) U.S. Cl.
CPC ..... *G07C 9/00896* (2013.01); *G07C 2209/08* (2013.01); *G07F 17/0057* (2013.01)

(58) Field of Classification Search
USPC ...... 340/5.64, 5.61, 5.7, 5.8; 455/3.01, 3.06, 455/410
See application file for complete search history.

(56) References Cited

U.S. PATENT DOCUMENTS

| | | | | |
|---|---|---|---|---|
| 9,437,062 | B2 * | 9/2016 | Ahearn | G07C 9/00174 |
| 9,607,458 | B1 * | 3/2017 | Schleiff | G07C 9/00571 |
| 9,626,859 | B2 * | 4/2017 | Ribas | G08C 17/02 |
| 10,109,006 | B2 * | 10/2018 | Yan | B62M 6/45 |
| 2006/0170533 | A1 * | 8/2006 | Chioiu | G07C 9/27 340/5.61 |
| 2012/0213362 | A1 * | 8/2012 | Bliding | G07C 9/00309 380/44 |
| 2015/0074004 | A1 * | 3/2015 | Song | G07F 17/0057 705/307 |
| 2015/0235496 | A1 * | 8/2015 | Vecchiotti | G07C 9/00309 340/5.61 |
| 2016/0350735 | A1 * | 12/2016 | Russell | G06Q 20/3274 |
| 2017/0109518 | A1 * | 4/2017 | Matsuura | G06F 21/34 |
| 2017/0352207 | A1 * | 12/2017 | Siklosi | G07C 9/00571 |
| 2018/0018840 | A1 * | 1/2018 | Xia | G06Q 10/02 |
| 2018/0262891 | A1 * | 9/2018 | Wu | H04W 4/00 |

FOREIGN PATENT DOCUMENTS

| | | | |
|---|---|---|---|
| CN | 104933020 | A | 9/2015 |
| CN | 105118133 | A | 12/2015 |
| CN | 105956903 | A | 9/2016 |
| CN | 106407168 | A | 2/2017 |

* cited by examiner

METHOD AND DEVICE FOR CONTROLLING CODE LOCK

CROSS-REFERENCE TO RELATED APPLICATIONS

This is a continuation of International Application PCT/CN2017/079717, with an international filing date of Apr. 7, 2017, which claims priority to Chinese Application No. 201611110548.7, filed on Dec. 2, 2016, the entire disclosure of which is hereby incorporated by reference in its entirety.

TECHNICAL FIELD

The present disclosure relates to the field of computer technology, specifically to the field of Internet technology, and more specifically to a method and a device for controlling a code lock.

BACKGROUND

With the rapid development of the Mobile Internet, borrowed bicycles have been widely used. A user may send an unlock request for a borrowed bicycle to a service provider through the client, acquire the unlock code of the code lock of the borrowed bicycle, and unlock the code lock using the unlock code to start using the borrowed bicycle. After the user has finished using the borrowed bicycle, the borrowed bicycle is re-locked and the service provider is notified of the current state of the borrowed bicycle, so that the next user may use the borrowed bicycle in the same method. At the same time, the service provider may also charge the user for the corresponding service fee based on the service time the borrowed bicycle is used.

The existing code lock control method for the borrowed bicycle usually requires the code lock of the borrowed bicycle to have a network communication function to feed back the current state of the code lock to the service provider. However, if the code lock of the borrowed bicycle has the network communication function, the service provider not only needs to have a network communication module built in the code lock, but also needs to pay a certain network communication fee to the telecom operator, resulting in high cost.

SUMMARY

The objective of the present disclosure is to propose an improved method and device for controlling a code lock, to solve the technical problem mentioned in the above Background section.

In a first aspect, the present disclosure provides a method for controlling a code lock, including: receiving an unlock request for a target code lock sent by a client; parsing the unlock request to determine whether the unlock request satisfies a preset unlock condition; acquiring a current state of the target code lock, in response to determining that the unlock request satisfies the preset unlock condition; if the current state of the target code lock is a locked state, acquiring an unlock code of a current code pair for the target code lock, changing the current state of the target code lock to an unlocked state, and sending the acquired unlock code to the client, such that a user uses the unlock code received by the client to unlock the target code lock; and changing the current state of the target code lock to the locked state, in response to receiving a lock feedback code of the current code pair for the target code lock sent by the client, the lock feedback code being displayed on the target code lock after the target code lock is locked.

In some embodiments, the method further includes: if the current state of the target code lock is the unlocked state, sending a prompt message to the client to prompt the client to send the lock feedback code displayed after the target code lock is locked.

In some embodiments, the acquiring an unlock code of a current code pair for the target code lock includes: acquiring a pre-stored code pair sequence built in the target code lock and a parameter for indicating the current code pair in the code pair sequence, and searching the code pair sequence for the unlock code of the current code pair indicated by the parameter.

In some embodiments, the method further includes:

changing the code pair currently indicated by the parameter to a next code pair of the current code pair, after receiving the lock feedback code of the current code pair for the target code lock sent by the client.

In some embodiments, the unlock request includes a user identifier; and the parsing the unlock request to determine whether the unlock request satisfies a preset unlock condition, includes: acquiring information of a user indicated by the user identifier to determine whether the user has an unlocking permission.

In some embodiments, the unlock request includes an identifier of the target code lock; and the parsing the unlock request to determine whether the unlock request satisfies a preset unlock condition, includes: searching a pre-stored identifier of a code lock for the identifier of the target code lock to determine whether the identifier of the target code lock is pre-stored.

In some embodiments, the method further includes: sending an abnormity prompt message to the client, in response to determining that the unlock request does not satisfy the preset unlock condition.

In some embodiments, the method further includes: recording unlock time and lock time of the target code lock.

In some embodiments, the method further includes: when a duration of the target code lock in the unlocked state exceeds a duration threshold, sending a timeout prompt message to the client.

In a second aspect, the present disclosure provides a device for controlling a code lock, including: an unlock request receiving unit, configured to receive an unlock request for a target code lock sent by a client; an unlock request parsing unit, configured to parse the unlock request to determine whether the unlock request satisfies a preset unlock condition; a current state acquisition unit, configured to acquire a current state of the target code lock, in response to determining that the unlock request satisfies the preset unlock condition; an unlock code acquisition unit, configured to, if the current state of the target code lock is a locked state, acquire an unlock code of a current code pair for the target code lock, change the current state of the target code lock to an unlocked state, and send the acquired unlock code to the client, such that a user uses the unlock code received by the client to unlock the target code lock; and a lock feedback code receiving unit, configured to change the current state of the target code lock to a locked state, in response to receiving a lock feedback code of the current code pair for the target code lock sent by the client, the lock feedback code being displayed on the target code lock after the target code lock is locked.

In some embodiments, the device further includes: a feedback prompting unit, configured to, if the current state of the target code lock is the unlocked state, send a prompt message to the client to prompt the client to send the lock feedback code displayed after the target code lock is locked.

In some embodiments, the unlock code acquisition unit is further configured to: acquire a pre-stored code pair sequence built in the target code lock and a parameter for indicating the current code pair in the code pair sequence, and search the code pair sequence for the unlock code of the current code pair indicated by the parameter.

In some embodiments, the device further includes: a current code pair indicating unit, configured to change the code pair currently indicated by the parameter to a next code pair of the current code pair, after receiving the lock feedback code of the current code pair for the target code lock sent by the client.

In some embodiments, the unlock request includes a user identifier; and the unlock request parsing unit is further configured to: acquire information of a user indicated by the user identifier to determine whether the user has an unlocking permission.

In some embodiments, the unlock request includes an identifier of the target code lock; and the unlock request parsing unit is further configured to: search a pre-stored identifier of a code lock for the identifier of the target code lock to determine whether the identifier of the target code lock is pre-stored.

In some embodiments, the device further includes: an abnormity prompting unit, configured to send an abnormity prompt message to the client, in response to determining that the unlock request does not satisfy the preset unlock condition.

In some embodiments, the device further includes: a time recording unit, configured to record unlock time and lock time of the target code lock.

In some embodiments, the device further includes: a timeout prompting unit, configured to, when a duration of the target code lock in the unlocked state exceeds a duration threshold, send a timeout prompt message to the client.

The method and device for controlling a code lock provided by the present disclosure parse the unlock request for a target code lock sent by a user to determine whether the user satisfies a preset unlock condition; acquire a current state of the target code lock, if the unlock condition is satisfied; if the current state of the target code lock is a locked state, acquire an unlock code of a current code pair for the target code lock, send to the client, such that the user uses the unlock code received by the client to unlock the target code lock, at the same time change the current state of the target code lock to the unlocked state; and change the current state of the target code lock to the locked state, in response to receiving a lock feedback code of the current code pair for the target code lock sent by the client. Therefore, the current state of the code lock is accurately fed back without setting the code lock with the network communication function, thereby reducing the cost of the code lock.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It may be appreciated that the specific embodiments described herein are merely used for explaining the relevant disclosure, rather than limiting the disclosure. In addition, it should be noted that, for the convenience of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
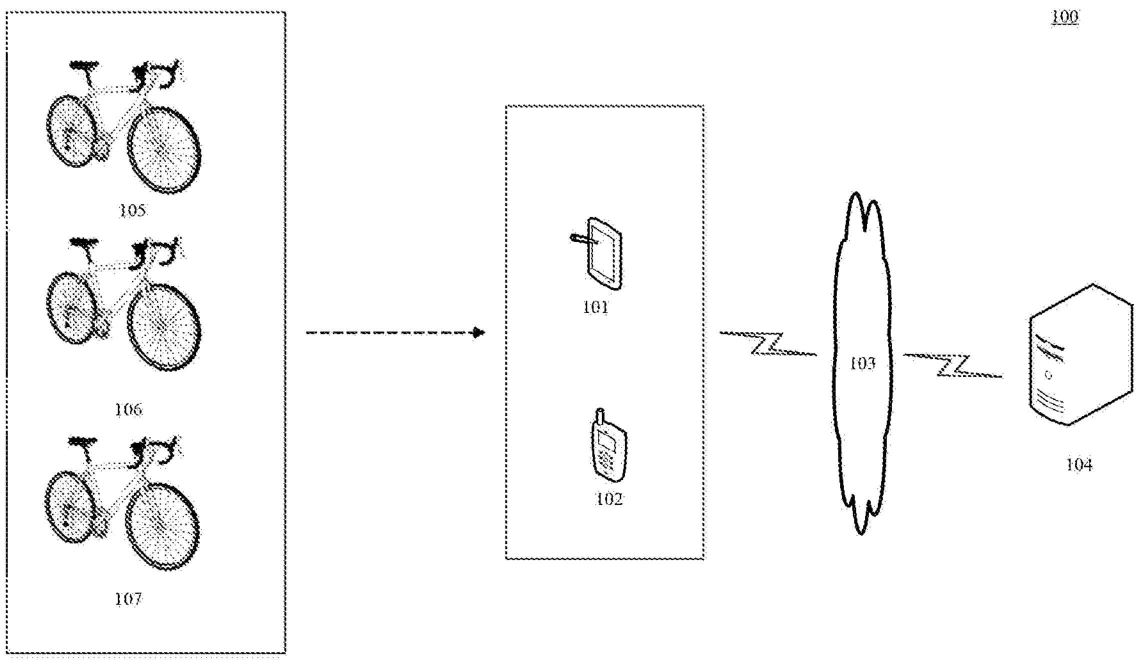
FIG. 1 is a diagram of an exemplary system architecture in which the present disclosure may be implemented.

FIG. 1 illustrates an exemplary system architecture 100 in which a method for controlling a code lock or a device for controlling a code lock of the embodiments of the present disclosure may be implemented.

As shown in FIG. 1, the system architecture 100 may include terminal devices 101, 102, a network 104, a server 105 and shared devices 105, 106, 107. The shared devices 105, 106, 107 are respectively equipped with a code lock. The network 103 serves as a medium providing a communication link between the terminal devices 101, 102 and the server 104. The network 103 may include various types of connections, such as wired or wireless communication links, or optical fibers.

When the user needs to use the shared device 105, 106, 107, the terminal devices 101, 102 may be used to interact with the server 104 via the network 103 to receive or send messages. Various communication client applications, such as shared device applications may be installed on the terminal devices 101 and 102.

The terminal devices 101, 102 may be various electronic devices having communication functions including, but not limited to, smart phones, tablets, smart watches.

The server 104 may be a server that provides various services. The server 104 may perform processing such as analysis on data such as unlock requests for the code locks of the shared devices 105, 106, and 107, and feed back the processing result (for example, the unlock code of the current code pair of the code lock) to the terminal devices. The server 104 may also analyze data such as the lock feedback code of the received current code pair, and change the current state of the code lock based on the analysis result (for example, change the current state of the code lock to a locked state).

The shared devices 105, 106, 107 may be devices for shared use by a plurality of users, for example, borrowed bicycles, self-service lockers, public charging posts. The shared devices 105, 106, 107 are respectively equipped with a code lock, and the code lock may not be set with the network communication function, but the code lock may be set with a display screen. When the code lock is locked, the lock feedback code of the current code pair is displayed on the display screen.

It should be noted that the method for controlling a code lock provided by the embodiments of the present disclosure is generally performed by the server 104. Accordingly, the device for controlling a code lock is generally provided in the server 104.

It should be understood that the numbers of terminal devices, networks, servers and shared devices in FIG. 1 are merely illustrative. Any number of terminal devices, networks, servers and shared devices may be provided based on the actual requirements.

Figure 2:
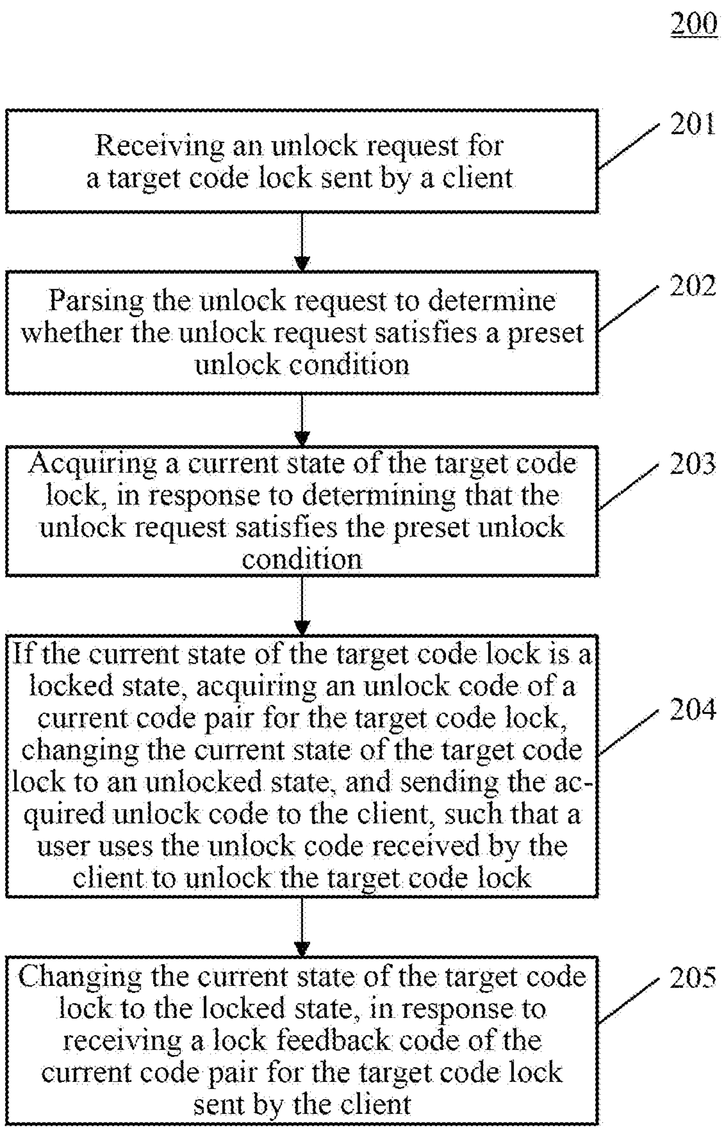
FIG. 2 is a flowchart of an embodiment of a method for controlling a code lock according to the present disclosure.

With further reference to FIG. 2, a flow 200 of an embodiment of a method for controlling a code lock according to the present disclosure is illustrated. The method for controlling a code lock includes the following steps.

Step 201, receiving an unlock request for a target code lock sent by a client.

In the present embodiment, an electronic device (for example, the server 104 as shown in FIG. 1) on which the method for controlling a code lock operates may receive an unlock request for a target code lock from a client through a wired connection or a wireless connection. The client may send the unlock request by scanning the target code lock or a QR code on the shared device equipped with the target code lock, or send the unlock request by entering the identifier on the target code lock or the shared device equipped with the target code lock. The shared device equipped with the code lock may be a borrowed bicycle, a self-service locker, a public charging post. The QR code may be a black and white graphic with a certain geometric pattern distributed in a plane according to certain rules, and may be used to uniquely identify the code lock or the shared device. The identifier on the code lock or the shared device may consist of numbers and/or letters, and may also be used to uniquely identify the code lock or the shared device.

Step 202, parsing the unlock request to determine whether the unlock request satisfies a preset unlock condition.

In the present embodiment, based on the unlock request obtained in step 201, the electronic device (for example, the server 104 shown in FIG. 1) may first parse the unlock request by using various analysis means to acquire information related to the unlock condition in the unlock request. Then, the information related to the unlock condition is compared with a preset unlock condition; if the information related to the unlock condition complies with the preset unlock condition, the preset unlock condition is satisfied, and step 203 is performed.

In some alternative implementations of the present embodiment, the unlock request may include a user identifier; and the parsing the unlock request to determine whether the unlock request satisfies a preset unlock condition, includes: acquiring information of a user indicated by the user identifier to determine whether the user has an unlocking permission. The user identifier may be an identifier assigned to the user to uniquely identify the user when registering a shared device application, and the user identifier may be composed of numbers and/or letters. The information of the user may include, but is not limited to, at least one of the following: the user's deposit payment status, the user's account balance, and the user's credit score. The preset unlock condition may include, but is not limited to, at least one of the following: the user has paid the deposit, the user's account balance is not less than a preset amount, and the user's credit score is not less than a preset credit score.

As an example, if the user satisfies the following three conditions: a deposit of 300 RMB has been paid, the account balance is not less than 10 RMB, and the credit score (percentile system) is above 80, it is determined that the preset unlock condition is satisfied.

In some alternative implementations of the present embodiment, the unlock request may include an identifier of the target code lock; and the parsing the unlock request to determine whether the unlock request satisfies a preset unlock condition, includes: searching a pre-stored identifier of a code lock for the identifier of the target code lock to determine whether the identifier of the target code lock is pre-stored. The code lock indicated by the pre-stored identifier of the code lock may be a code lock that has been installed on the shared device, and the shared device is in a normal service condition. As an example, the electronic device may match the identifier of the target code lock with the pre-stored identifier of the code lock. If the matching is successful, the identifier of the target code lock is pre-stored, and it may be determined that the preset unlock condition is satisfied; if the matching fails, the identifier of the target code lock is not pre-stored, and it may be determined that the preset unlock condition is not satisfied.

In some alternative implementations of the present embodiment, the unlock request may include an identifier of the shared device equipped with the target code lock; and the parsing the unlock request to determine whether the unlock request satisfies a preset unlock condition, includes: acquiring the identifier of the target code lock, based on the identifier of the shared device equipped with the target code lock and the pre-stored corresponding relationship between the identifier of the shared device equipped with the code lock and the identifier of the code lock, and searching a pre-stored identifier of a code lock for the identifier of the target code lock to determine whether the identifier of the target code lock is pre-stored.

In some alternative implementations of the present embodiment, an abnormity prompt message is sent to the client, in response to determining that the unlock request does not satisfy the preset unlock condition. The abnormality prompt message may be used to prompt the user for the reason that the preset unlock condition is not satisfied, and prompt the user the corresponding solution. As an example, the abnormality prompt message may prompt the user that the target code lock cannot be unlocked due to the account balance being less than 10 RMB, and the user is prompted to recharge in time.

Step 203, acquiring a current state of the target code lock, in response to determining that the unlock request satisfies the preset unlock condition.

In the present embodiment, if the unlock request satisfies the preset unlock condition, the electronic device (for example, the server 104 shown in FIG. 1) may acquire the pre-stored current state of the target code lock. The current state of the target code lock may be a locked state or an unlocked state.

In the present embodiment, the identifier of the code lock and the current state of the code lock may be pre-stored in the electronic device; if the unlock request satisfies the preset unlock condition, the electronic device may first match the identifier of the target code lock with the pre-stored identifier of the code lock; and then acquire the current state of the code lock successfully matched. The current state of the code lock successfully matched is the current state of the target code lock.

It should be noted that the identifier of the code lock and the current state of the code lock may also be pre-stored in a third-party server. The specific storage location and storage format are not limited in this embodiment.

Step 204, if the current state of the target code lock is a locked state, acquiring an unlock code of a current code pair for the target code lock, changing the current state of the target code lock to an unlocked state, and sending the acquired unlock code to the client, such that a user can use the unlock code received by the client to unlock the target code lock.

In the present embodiment, if the current state of the target code lock is a locked state, the electronic device (for example, the server 104 shown in FIG. 1) may first acquire an unlock code of the current code pair for the pre-stored target code lock, and send the unlock code to the client, for the user to unlock the target code lock using the unlock code received by the client; and then change the current state of the target code lock to the unlocked state. The unlock code may be used to unlock the target code lock for the user to use the shared device equipped with the target code lock.

Step 205, changing the current state of the target code lock to a locked state, in response to receiving a lock feedback code of the current code pair for the target code lock sent by the client.

In the present embodiment, if the electronic device (for example, the server 104 shown in FIG. 1) receives a lock feedback code of the current code pair for the target code lock sent by the client, the electronic device may change the current state of the target code lock to the locked state. The lock feedback code may be displayed on the target code lock after the target code lock is locked.

In the present embodiment, after the user finishes using the shared device equipped with the target code lock and locks the target code lock, the lock feedback code may be displayed on the display screen of the target code lock, for the user to send the lock feedback code to the electronic device through the client. When the electronic device receives the lock feedback code, it may be determined that the user has finished using the shared device equipped with the target code lock, and change the current state of the target code lock to the locked state, so that the next user can unlock the target code lock in the same way and use the shared device equipped with the target code lock.

In some alternative implementations of the present embodiment, if the current state of the target code lock is the unlocked state, sending a prompt message to the client to prompt the client to send the lock feedback code displayed after the target code lock is locked. As an example, if the previous user forgets to lock the target code lock or the previous user locks the target code lock and forgets to send the lock feedback code, the electronic device may send a prompt message to the user who initiates the unlock request. The user may determine whether the target code lock has been locked based on the prompt of the prompt message, and send the lock feedback code displayed on the target code lock to the electronic device if the target code lock has been locked. The electronic device, after receiving the lock feedback code, changes the current state of the target code lock to the locked state, so that the user acquires the unlock code of the current code pair for the target code lock.

In some alternative implementations of the present embodiment, the electronic device may also record unlock time and lock time of the target code lock. The unlock time may be the time when the electronic device sends the unlock code to the client, or the time when the electronic device sends the unlock code to the client and plus a preset duration. The lock time may be the time when the electronic device receives the lock feedback code, or the time when the electronic device receives the lock feedback code and minus the preset duration. For example, the time when the electronic device sends the unlock code is 2016/11/28 13:20:00, and the electronic device records 2016/11/28 13:30:00 as the unlock time to ensure that after the client receives the unlock code, the user may unlock the target code lock within 10 minutes; the time when the electronic device receives the lock feedback code is 2016/11/28 15:20:00, and the electronic device records 2016/11/28 15:10:00 as the lock time to ensure that after the user locks the target code lock, the user may send the lock feedback code to the electronic device within 10 minutes.

In some alternative implementations of the present embodiment, the electronic device may calculate the service fee based on the unlock time, the lock time, and preset charging information, and deduct it from the user's account balance.

In some alternative implementations of the present embodiment, when a duration of the target code lock in the unlocked state exceeds a duration threshold, a timeout prompt message is sent to the client. For example, the unlock time of the target code lock is 2016/11/28 13:30:00, and the duration threshold is 4 hours. If the electronic device has not received the lock feedback code sent by the client by 2016/11/28 17:30:00, it sends a timeout prompt message to the client to prompt the user that it exceeds 4 hours for using the borrowed bicycle equipped with the target code lock, so as to avoid the user forgetting to send the lock feedback code to the electronic device after the user has finished using the borrowed bicycle.

Figure 3:
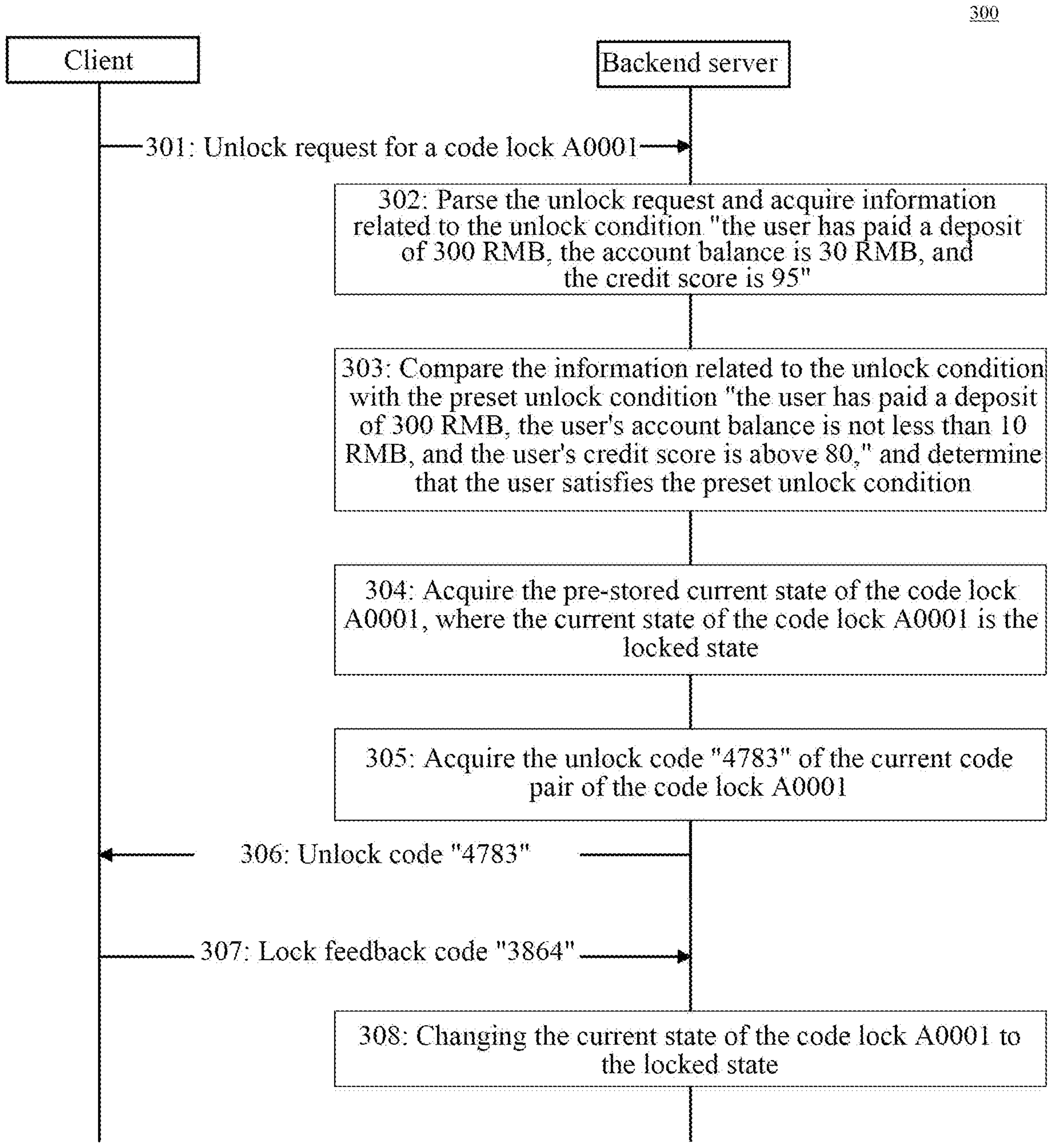
FIG. 3 is a timing diagram of an application scenario of the method for controlling a code lock according to the present disclosure.

With further reference to FIG. 3, FIG. 3 is a timing diagram of an application scenario of the method for controlling a code lock according to the present embodiment. In the application scenario of FIG. 3, as shown in 301, the user first initiates an unlock request for a code lock installed on a borrowed bicycle through a client, where the identifier of the code lock is A0001; as shown in 302, a backend server may parse the unlock request and acquire information related to the unlock condition: the user has paid a deposit of 300 RMB, the account balance is 30 RMB, and the credit score is 95; as shown in 303, the backend server may compare the information related to the unlock condition with the preset unlock condition "the user has paid a deposit of 300 RMB, the user's account balance is not less than 10 RMB, and the user's credit score is above 80," and determine that the user satisfies the preset unlock condition; as shown in 304, the backend server acquires the pre-stored current state of the code lock A0001, where the current state of the code lock A0001 is the locked state; as shown in 305, the backend server may acquire the unlock code "4783" of the current code pair of the code lock A0001; as shown in 306, the backend server may send the unlock code "4783" to the client of the user, and the user uses the unlock code "4783" to unlock the code lock A0001, and starts to use the borrowed bicycle; after the user finishes using the bicycle, the user locks the code lock A0001, and the lock feedback code "3864" of the current code pair of the code lock A0001 is displayed on the display screen of the code lock A0001; as shown in 307, the user sends the lock feedback code "3864" to the backend server through the client; as shown in 308, the backend server changes the current state of the code lock A0001 to the locked state.

The method and device for controlling a code lock provided by the present disclosure parse the unlock request for a target code lock sent by a user to determine whether the user satisfies a preset unlock condition; acquire a current state of the target code lock, if the unlock condition is satisfied; if the current state of the target code lock is a locked state, acquire an unlock code of a current code pair for the target code lock, send the unlock code to the client, such that the user can use the unlock code received by the client to unlock the target code lock, at the same time change the current state of the target code lock to the unlocked state; and change the current state of the target code lock to the locked state, in response to receiving a lock feedback code of the current code pair for the target code lock sent by the client. Therefore, the current state of the code lock is accurately fed back without setting the code lock with the network communication function, thereby reducing the cost of the code lock.

Figure 4:
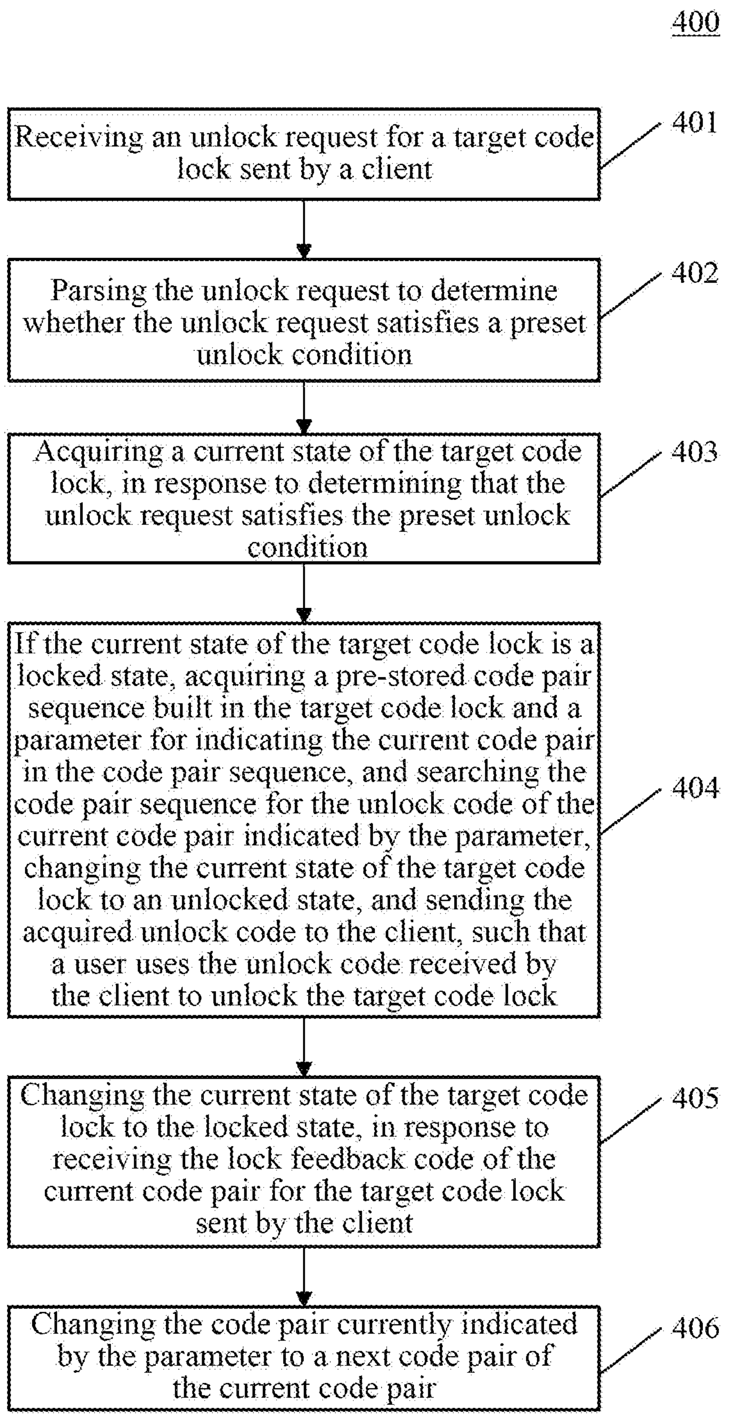
FIG. 4 is a flowchart of another embodiment of the method for controlling a code lock according to the present disclosure.

With further reference to FIG. 4, a flow 400 of another embodiment of the method for controlling a code lock is illustrated. The flow 400 of the method for controlling a code lock includes the following steps.

Step 401, receiving an unlock request for a target code lock sent by a client.

In the present embodiment, an electronic device (for example, the server 104 as shown in FIG. 1) on which the method for controlling a code lock operates may receive an unlock request for a target code lock sent by a client through a wired connection or a wireless connection.

Step 402, parsing the unlock request to determine whether the unlock request satisfies a preset unlock condition.

In the present embodiment, based on the unlock request obtained in step 401, the electronic device (for example, the server 104 shown in FIG. 1) may first parse the unlock request by using various analysis means to acquire information related to the unlock condition in the unlock request. Then, the information related to the unlock condition is compared with a preset unlock condition; if the information related to the unlock condition complies with the preset unlock condition, the preset unlock condition is satisfied, and step 403 is performed.

Step 403, acquiring a current state of the target code lock, in response to determining that the unlock request satisfies the preset unlock condition.

In the present embodiment, if the unlock request satisfies the preset unlock condition, the electronic device (for example, the server 104 shown in FIG. 1) may acquire the current state of the pre-stored target code lock. The current state of the target code lock may be a locked state or an unlocked state.

Step 404, if the current state of the target code lock is a locked state, acquiring a pre-stored code pair sequence built in the target code lock and a parameter for indicating the current code pair in the code pair sequence, and searching the code pair sequence for the unlock code of the current code pair indicated by the parameter, changing the current state of the target code lock to an unlocked state, and sending the acquired unlock code to the client, such that a user uses the unlock code received by the client to unlock the target code lock.

In the present embodiment, if the current state of the target code lock is the locked state, the electronic device (for example, the server 104 shown in FIG. 1) may first acquire a pre-stored code pair sequence built in the target code lock and a parameter for indicating the current code pair in the code pair sequence, and then search the code pair sequence for the unlock code of the current code pair indicated by the parameter, and send the acquired unlock code to the client, such that the user can use the unlock code received by the client to unlock the target code lock. Finally, the current state of the target code lock is changed to the unlocked state.

In the present embodiment, the identifier of the code lock, the parameter of the code lock, and the code pair sequence built in the code lock may be pre-stored in the electronic device; if the unlock request satisfies the preset unlock condition, the electronic device may first match the identifier of the target code lock with the pre-stored identifier of the code lock; and then the parameter of the code lock and the code pair sequence built in the code lock successfully matched are acquired. The parameter of the code lock and the code pair sequence built in the code lock successfully matched are the parameter of the target code lock and the code pair sequence built in the target code lock.

It should be note that the identifier of the code lock, the parameter of the code lock, and the code pair sequence built in the code lock may also be pre-stored in a third-party server. The specific storage location and storage format are not limited in this embodiment.

Step 405, changing the current state of the target code lock to the locked state, in response to receiving the lock feedback code of the current code pair for the target code lock sent by the client.

In the present embodiment, if the electronic device (for example, the server 104 shown in FIG. 1) receives the lock feedback code of the current code pair for the target code lock sent by the client, the electronic device may change the current state of the target code lock to the locked state. The lock feedback code may be displayed on the target code lock after the target code lock is locked.

Step 406, changing the code pair currently indicated by the parameter to a next code pair of the current code pair.

In the present embodiment, if the electronic device (for example, the server 104 shown in FIG. 1) receives the lock feedback code of the current code pair for the target code lock sent by the client, the electronic device may change the code pair currently indicated by the parameter to the next code pair of the current code pair.

In the present embodiment, the code lock may be a code lock with a built-in code pair sequence. Each time the code lock undergoes an unlocking and locking operation, the code lock uses the next code pair in the code pair sequence as the unlock code and the lock feedback code of the next user. If the last code pair in the code pair sequence is used, the code lock may re-use the first code pair in the code pair sequence as the next user's unlock code and lock feedback code. The parameter may be used to indicate the current code pair in the code pair sequence built in the target code lock, and after receiving the lock feedback code of the current code pair, the parameter may indicate the next code pair in the code pair sequence as the current code pair. If the received lock feedback code is a lock feedback code of the last code pair in the code pair sequence, the parameter may also re-indicate the first code pair in the code pair sequence as the current code pair. By setting the parameter, not only the code pair in the target code lock and the code pair in the electronic device are synchronously updated, but also the code pair in the code pair sequence is recycled, without setting the target code lock with the network communication function.

As can be seen from FIG. 4, as compared with the embodiment corresponding to FIG. 2, the flow 400 of the method for controlling a code lock in the present embodiment adds the step of synchronously updating the code pair in the target code lock and the code pair in the electronic device. Therefore, the solution described in the present embodiment not only solves the problem of the risk of misappropriation of the code lock using the fixed code and the problem that a one-time unlocking is used indefinitely, and also realizes the synchronous updating of the code pair in the code lock and the code pair in the electronic device, without setting the target code lock with the network communication function.

Figure 5:
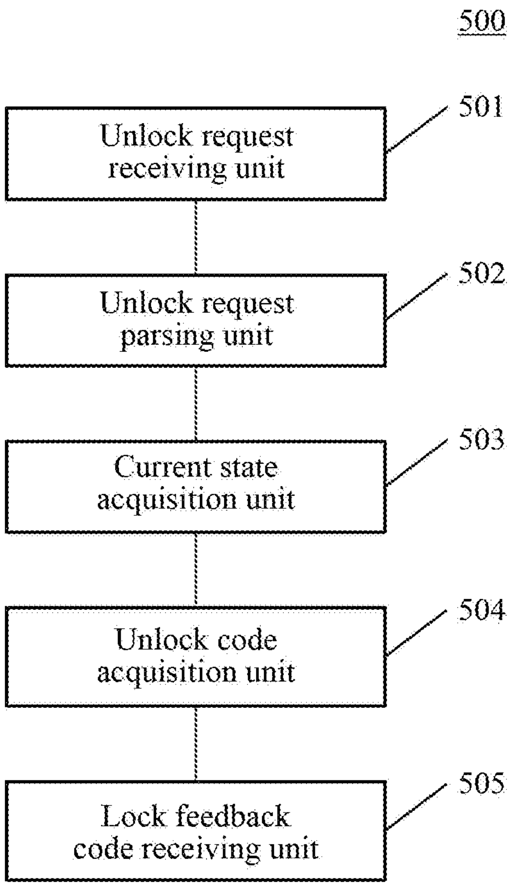
FIG. 5 is a schematic structural diagram of an embodiment of a device for controlling a code lock according to the present disclosure.

With further reference to FIG. 5, as an implementation of the method shown in the above figures, the present disclosure provides an embodiment of a device for controlling a code lock, and the device embodiment corresponds to the method embodiment as shown in FIG. 2, and the device may be specifically applied to various electronic devices.

As shown in FIG. 5, the device 500 for controlling a code lock of the present embodiment includes: an unlock request receiving unit 501, an unlock request parsing unit 502, a current state acquisition unit 503, an unlock code acquisition unit 504 and a lock feedback code receiving unit 505. The unlock request receiving unit 501 is configured to receive an unlock request for a target code lock sent by a client; the unlock request parsing unit 502 is configured to parse the unlock request to determine whether the unlock request satisfies a preset unlock condition; the current state acquisition unit 503 is configured to acquire a current state of the target code lock, in response to determining that the unlock request satisfies the preset unlock condition; the unlock code acquisition unit 504 is configured to, if the current state of the target code lock is a locked state, acquire an unlock code of a current code pair for the target code lock, change the current state of the target code lock to an unlocked state, and send the acquired unlock code to the client, such that a user uses the unlock code received by the client to unlock the target code lock; and the lock feedback code receiving unit 505 is configured to change the current state of the target code lock to the locked state, in response to receiving a lock feedback code of the current code pair for the target code lock sent by the client, the lock feedback code being displayed on the target code lock after the target code lock is locked.

In the present embodiment, in the device 500 for controlling a code lock: the specific processing of the unlock request receiving unit 501, the unlock request parsing unit 502, the current state acquisition unit 503, the unlock code acquisition unit 504 and the lock feedback code receiving unit 505 and the beneficial effects thereof may refer to the related descriptions of the implementations of the step 201, the step 202, the step 203, the step 204, and the step 205 in the corresponding embodiment of FIG. 2, and detailed descriptions thereof will be omitted.

In some alternative implementations of the present embodiment, the device 500 further includes: a feedback prompting unit, configured to, if the current state of the target code lock is the unlocked state, send a prompt message to the client to prompt the client to send the lock feedback code displayed after the target code lock is locked.

In some alternative implementations of the present embodiment, the unlock code acquisition unit 504 is further configured to: acquire a pre-stored code pair sequence built in the target code lock and a parameter for indicating the current code pair in the code pair sequence, and search the code pair sequence for the unlock code of the current code pair indicated by the parameter.

In some alternative implementations of the present embodiment, the device 500 further includes: a current code pair indicating unit, configured to change the code pair currently indicated by the parameter to a next code pair of the current code pair, after receiving the lock feedback code of the current code pair for the target code lock sent by the client.

In some alternative implementations of the present embodiment, the unlock request includes a user identifier; and the unlock request parsing unit 502 is further configured to: acquire information of a user indicated by the user identifier to determine whether the user has an unlocking permission.

In some alternative implementations of the present embodiment, the unlock request includes an identifier of the target code lock; and the unlock request parsing unit 502 is further configured to: search a pre-stored identifier of a code lock for the identifier of the target code lock to determine whether the identifier of the target code lock is pre-stored.

In some alternative implementations of the present embodiment, the device 500 further includes: an abnormity prompting unit, configured to send an abnormity prompt message to the client, in response to determining that the unlock request does not satisfy the preset unlock condition.

In some alternative implementations of the present embodiment, the device 500 further includes: a time recording unit, configured to record unlock time and lock time of the target code lock.

In some alternative implementations of the present embodiment, the device 500 further includes: a timeout prompting unit, configured to, when a duration of the target code lock in the unlocked state exceeds a duration threshold, send a timeout prompt message to the client.

Figure 6:
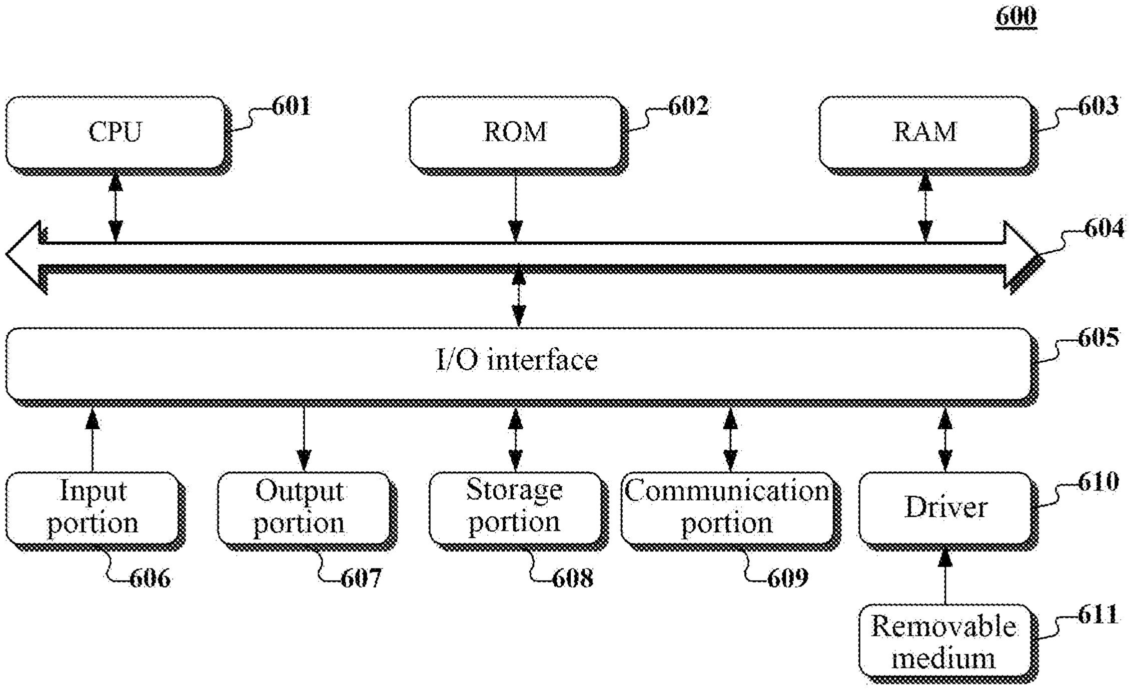
FIG. 6 is a schematic structural diagram of a computer system adapted to implement a server of embodiments of the present disclosure.

With further reference to FIG. 6, a schematic structural diagram of a computer system 600 adapted to implement a server of the embodiments of the present disclosure is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse, etc.; an output portion 607 including such as a cathode ray tube (CRT), a liquid crystal display device (LCD), a speaker, etc.; a storage portion 608 including a hard disk and the like; and a communication portion 609 including a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication portion 609, and/or may be installed from the removable medium 611. The computer program, when executed by the central processing unit (CPU) 601, implements the above mentioned functionalities as defined by the method of the present disclosure.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The units involved in the embodiments of the present disclosure may be implemented by means of software or hardware. The described units may also be provided in a processor, for example, described as: a processor, including an unlock request receiving unit, an unlock request parsing unit, a current state acquisition unit, an unlock code acquisition unit and a lock feedback code receiving unit. Here, the names of these units do not in some cases constitute a limitation to such units themselves. For example, the unlock request receiving unit may also be described as "a unit for receiving an unlock request for a target code lock sent by a client."

In another aspect, the present disclosure further provides a non-transitory computer storage medium. The non-transitory computer storage medium may be included in the device in the above described embodiments, or a stand-alone non-volatile computer storage medium not assembled into the terminal. The non-transitory computer storage medium stores one or more programs. The one or more programs, when executed by a device, cause the device to: receive an unlock request for a target code lock sent by a client; parse the unlock request to determine whether the unlock request satisfies a preset unlock condition; acquire a current state of the target code lock, in response to determining that the unlock request satisfies the preset unlock condition; if the current state of the target code lock is a locked state, acquire an unlock code of a current code pair for the target code lock, change the current state of the target code lock to an unlocked state, and send the acquired unlock code to the client, such that a user uses the unlock code received by the client to unlock the target code lock; and change the current state of the target code lock to the locked state, in response to receiving a lock feedback code of the current code pair for the target code lock sent by the client, the lock feedback code being displayed on the target code lock after the target code lock is locked.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for controlling a code lock, the method comprising:

receiving an unlock request for a target code lock sent by a client;

parsing the unlock request to determine whether the unlock request satisfies a preset unlock condition;

acquiring a current state of the target code lock, in response to determining that the unlock request satisfies the preset unlock condition;

if the current state of the target code lock is a locked state, acquiring an unlock code of a current code pair for the target code lock, changing the current state of the target code lock to an unlocked state, and sending the acquired unlock code to the client, such that a user uses the unlock code received by the client to unlock the target code lock; and changing the current state of the target code lock to the locked state, in response to receiving a lock feedback code of the current code pair for the target code lock sent by the client, the lock feedback code being displayed on the target code lock after the target code lock is locked.

2. The method according to claim 1, wherein the method further comprises:

if the current state of the target code lock is the unlocked state, sending a prompt message to the client to prompt the client to send the lock feedback code displayed after the target code lock is locked.

3. The method according to claim 1, wherein the acquiring an unlock code of a current code pair for the target code lock comprises:

acquiring a pre-stored code pair sequence built in the target code lock and a parameter for indicating the current code pair in the code pair sequence, and searching the code pair sequence for the unlock code of the current code pair indicated by the parameter.

4. The method according to claim 3, wherein the method further comprises:

changing the code pair currently indicated by the parameter to a next code pair of the current code pair, after receiving the lock feedback code of the current code pair for the target code lock sent by the client.

5. The method according to claim 1, wherein the unlock request comprises a user identifier; and the parsing the unlock request to determine whether the unlock request satisfies a preset unlock condition, comprises:

acquiring information of a user indicated by the user identifier to determine whether the user has an unlocking permission.

6. The method according to claim 1, wherein the unlock request comprises an identifier of the target code lock; and the parsing the unlock request to determine whether the unlock request satisfies a preset unlock condition, comprises:

searching a pre-stored identifier of a code lock for the identifier of the target code lock to determine whether the identifier of the target code lock is pre-stored.

7. The method according to claim 1, wherein the method further comprises:

sending an abnormity prompt message to the client, in response to determining that the unlock request does not satisfy the preset unlock condition.

8. The method according to claim 1, wherein the method further comprises:

recording unlock time and lock time of the target code lock.

9. The method according to claim 8, wherein the method further comprises:

when a duration of the target code lock in the unlocked state exceeds a duration threshold, sending a timeout prompt message to the client.

10. A device for controlling a code lock, the device comprising:

at least one processor; and a memory storing instructions, the instructions when executed by the at least one processor, cause the at least one processor to perform operations, the operations comprising:

receiving an unlock request for a target code lock sent by a client;

parsing the unlock request to determine whether the unlock request satisfies a preset unlock condition;

acquiring a current state of the target code lock, in response to determining that the unlock request satisfies the preset unlock condition;

if the current state of the target code lock is a locked state, acquiring an unlock code of a current code pair for the target code lock, changing the current state of the target code lock to an unlocked state, and sending the acquired unlock code to the client, such that a user uses the unlock code received by the client to unlock the target code lock; and changing the current state of the target code lock to the locked state, in response to receiving a lock feedback code of the current code pair for the target code lock sent by the client, the lock feedback code being displayed on the target code lock after the target code lock is locked.

11. The device according to claim 10, wherein the operations further comprise:

if the current state of the target code lock is the unlocked state, sending a prompt message to the client to prompt the client to send the lock feedback code displayed after the target code lock is locked.

12. The device according to claim 10, wherein the acquiring an unlock code of a current code pair for the target code lock comprises:

acquiring a pre-stored code pair sequence built in the target code lock and a parameter for indicating the current code pair in the code pair sequence, and searching the code pair sequence for the unlock code of the current code pair indicated by the parameter.

13. The device according to claim 12, wherein the operations further comprise:

changing the code pair currently indicated by the parameter to a next code pair of the current code pair, after receiving the lock feedback code of the current code pair for the target code lock sent by the client.

14. The device according to claim 10, wherein the unlock request comprises a user identifier; and the parsing the unlock request to determine whether the unlock request satisfies a preset unlock condition, comprises:

acquiring information of a user indicated by the user identifier to determine whether the user has an unlocking permission.

15. The device according to claim 10, wherein the unlock request comprises an identifier of the target code lock; and the parsing the unlock request to determine whether the unlock request satisfies a preset unlock condition, comprises:

searching a pre-stored identifier of a code lock for the identifier of the target code lock to determine whether the identifier of the target code lock is pre-stored.

16. The device according to claim 10, wherein the operations further comprise:

sending an abnormity prompt message to the client, in response to determining that the unlock request does not satisfy the preset unlock condition.

17. The device according to claim 10, wherein the operations further comprise:

recording unlock time and lock time of the target code lock.

18. The device according to claim 17, wherein the operations further comprise:

when a duration of the target code lock in the unlocked state exceeds a duration threshold, sending a timeout prompt message to the client.

19. A non-transitory computer storage medium, storing computer readable instructions executable by a processor, the computer readable instructions, when executed by the processor, cause the processor to perform operations, the operations comprising:

receiving an unlock request for a target code lock sent by a client;

parsing the unlock request to determine whether the unlock request satisfies a preset unlock condition;

acquiring a current state of the target code lock, in response to determining that the unlock request satisfies the preset unlock condition;

if the current state of the target code lock is a locked state, acquiring an unlock code of a current code pair for the target code lock, changing the current state of the target code lock to an unlocked state, and sending the acquired unlock code to the client, such that a user uses the unlock code received by the client to unlock the target code lock; and changing the current state of the target code lock to the locked state, in response to receiving a lock feedback code of the current code pair for the target code lock sent by the client, the lock feedback code being displayed on the target code lock after the target code lock is locked.

* * * * *